Feb. 4, 1958
J. W. WALLACE
2,822,221
PRUNING AND PICKING TABLE
Filed April 27, 1956
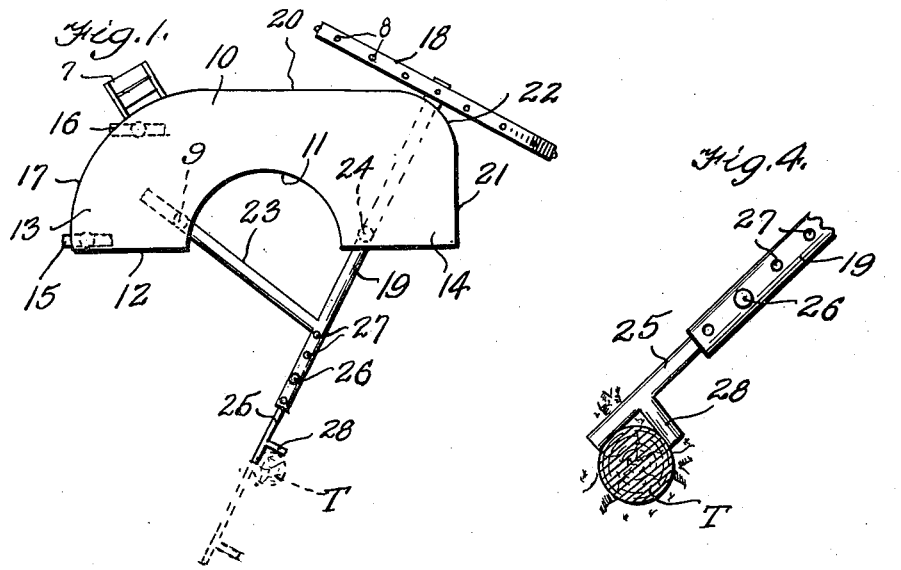
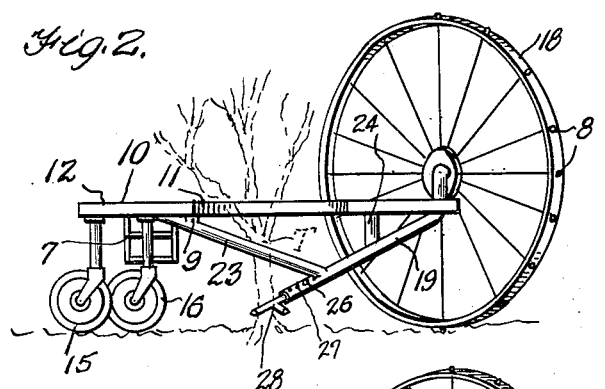
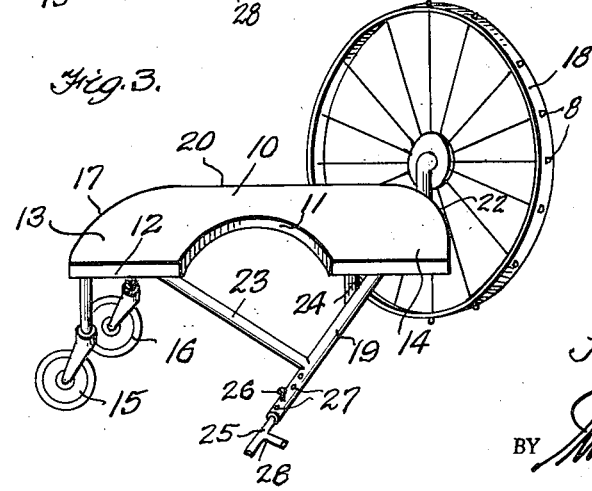
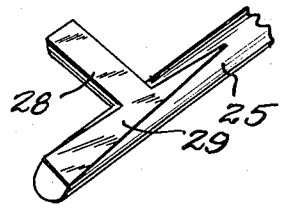
INVENTOR
JAMES W. WALLACE
BY
HIS ATTORNEY

United States Patent Office 2,822,221
Patented Feb. 4, 1958

2,822,221
PRUNING AND PICKING TABLE

James W. Wallace, Grand Junction, Colo.

Application April 27, 1956, Serial No. 581,228

7 Claims. (Cl. 304—9)

This invention relates to a pruning and picking table, and has for one of its objects the production of a simple and efficient table having an extension for contacting the trunk of a tree constituting a fulcrum, and a supporting wheel, so mounted as to facilitate the turning of the table around the tree while the table is kept at a regular distance from the tree.

Another object of this invention is the production of a simple and efficient pruning and picking table having an adjustable tree trunk engaging extension for maintaining the table at a selected distance from the tree to facilitate picking fruit from the tree or the pruning of the tree.

Other objects and advantages of the present invention will appear throughout the following specification and claims.

In the drawing:

Figure 1 is a top plan view of the table;

Figure 2 is a side elevational view thereof;

Figure 3 is a perspective view thereof;

Figure 4 is a fragmentary top plan view of the tree trunk engaging end of the adjustable extension;

Figure 5 is a fragmentary perspective view showing the under face of the outer end of the extension portion of the axle.

By referring to the drawing in detail, it will be seen that 10 designates the body of a table which constitutes a platform upon which the operator stands. The body 10 is provided with a cut-out portion or recess 11 in its inner edge 12 which is adapted to be placed nearest the tree trunk. The cut-out portion or recess 11 is preferably semicircular and provides a means to allow the table to be placed close to the trunk of the tree and lower protruding limbs of the tree to extend through the recess without abutting the table body 10. This recess 11 defines end platform portions 13 and 14 laterally of the recess, as is clearly shown in Figure 1.

A pair of follow or swivel wheels 15 and 16 support the forward end 17 of the table body 10, and a propelling wheel 18 is carried by an axle 19, which axle 19 extends diagonally under the bottom of the table body 10 from the inner edge 12 toward the outer edge 20 and the rear corner 22 adjacent the rear end 21 of the table body 10. The axle 19 is also inclined downwardly from the rear cover 22 of the table body 10 to a point forwardly of and in line with the approximate center of the recess 11, as is shown in Figures 1 and 2.

A diagonal brace rod 23 is fixed at one end to the under face of the table body 10, and at its opposite end to the axle 19 near its outer end. The brace rod 23 is also braced by a vertical brace 9 which is secured to the under face of the body 10. The axle 19 is also fixed to the under face of the table body 10, and is braced by a vertical brace 24. It will be noted by considering Figure 1, that the wheel 19 extends at an angle to the rear edge 20 of the table body 10, to facilitate the rotation of the table body 10 around a tree trunk.

Steps 7 are carried by the table body 10, and lugs 8 are formed on the tread of the wheel 18, as shown in the drawing.

The axle 19 is provided with an extension portion 25 which is adjustable longitudinally of, or within the axle 19, and is held in a selected adjusted position by means of a pin 26 which fits through one of the apertures 27 formed in the axle and engages the extension portion 25 to lock the extension portion in a selected position. This adjustment facilitates the adjustment of the axle 19 for larger and smaller trees. The extension portion 25 is provided with a forked outer end 28 which is adapted to engage a tree trunk T shown in Figure 4 to provide a fulcrum point. The forked end 28 is adapted to engage the tree trunk near the ground, and the under face of the forked outer end 28 is preferably beveled, as at 29, on its under face, as shown in Figure 5, to facilitate passage over the soil near the base of the tree trunk as the table is being swung around the trunk by the rotation of the wheel 18.

The operation of the device is as follows:

An operator stands on the body 10, after the forked outer end 28 of the extension portion 25 has been placed against the tree trunk T at a selected distance. As the fruit is picked from the tree or the tree has been pruned, the operator rotates the wheel 18 with his hand in the desired direction to move the table around the tree to a selected position. It will be noted that the propelling wheel is mounted at an incline or angle to the longitudinal axis of the body 10 so that by the rotation of the wheel 18 the body 10 will be moved around the tree trunk T to a selected position. This may be accomplished since the forked outer end 28 constitutes a fulcrum against the trunk of the tree, and since the shaft 19 extends at an angle to the fulcrum point and the wheel 18 is supported at an angle to the front edge 12 of the body 10 and across the rear corner 22, as shown in Figure 1. The operator may therefor rotate the table completely around the tree with the forked outer end 28 of the extension portion 25 acting as a fulcrum.

Having described the invention, what is claimed as new is:

1. A pruning and picking table of the class described comprising a body, swivel wheels supporting one end of said body, a propeller wheel supporting the opposite end of said body at an angle to the longitudinal axis of said body, and a fulcrum carried by said body and projecting from one side of said body opposite to said propeller wheel and adapted to engage an abutment to facilitate the swinging of said body around said abutment as an operator standing upon said table rotates said propeller wheel in a desired direction to a selected position.

2. A pruning and picking table of the class described comprising a body, a shaft extending at an angle to the longitudinal axis of the body of the table and in a downwardly inclined direction under the body, a propelling wheel carried by the outer end of said axle upon the outer side of the body and at an angle to the longitudinal axis of said body, the propelling wheel extending at substantially right-angles to said shaft, and said shaft having a tree trunk engaging fulcrum extending beyond the side of said body opposite said propelling wheel to facilitate the moving of said body around said tree trunk to a selected position, as said propelling wheel is rotated in a selected direction.

3. A device as defined in claim 2, wherein said shaft is braced by a diagonal brace secured at one end to the under face of said body and at its opposite end to said shaft intermediate the ends thereof.

4. A device as defined in claim 2, wherein said fulcrum comprises an extension portion slidable longitudinally of said shaft, and means for locking said extension portion in a selected position to selectively increase and decrease the length of said fulcrum.

5. A device as defined in claim 2, wherein said fulcrum comprises a forked outer end to fit around a tree trunk.

6. A device as defined in claim 2, wherein said fulcrum comprises a forked outer end to fit around a tree trunk, and wherein the under face of said forked outer end is beveled.

7. A device as defined in claim 2, wherein the body is provided with an inner edge having a recess formed therein to accommodate the lower branches of a tree as the body is moved about a tree trunk.

References Cited in the file of this patent

UNITED STATES PATENTS

| | | |
|---|---|---|
| 967,803 | Mercer | Aug. 16, 1910 |
| 1,331,121 | Nelson | Feb. 17, 1920 |
| 1,362,944 | Kirby | Dec. 21, 1920 |
| 2,405,453 | Savage | Aug. 6, 1946 |